J. M. SMITH.
Snow-Plows.

No. 149,536.

2 Sheets--Sheet 1.

Patented April 7, 1874.

WITNESSES.
Edmund Masson
John R. Young

INVENTOR.
John M. Smith, by
Prindle and Co his Attys

J. M. SMITH.
Snow-Plows.
No. 149,536.
2 Sheets--Sheet 2.
Patented April 7, 1874.
FIG: 3.
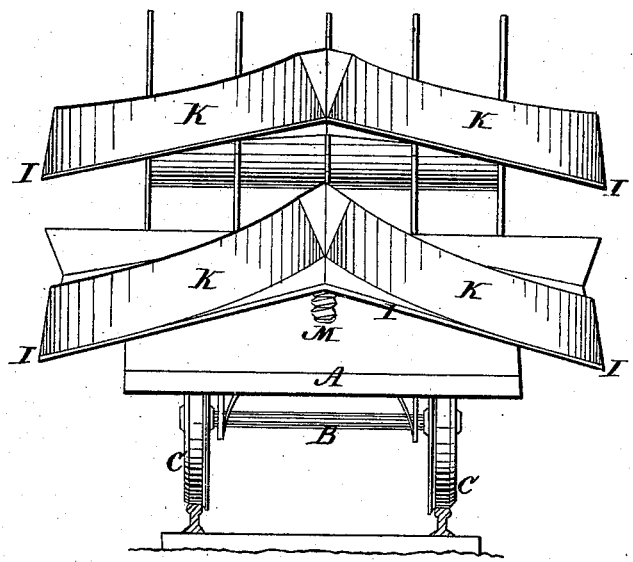
FIG: 4.
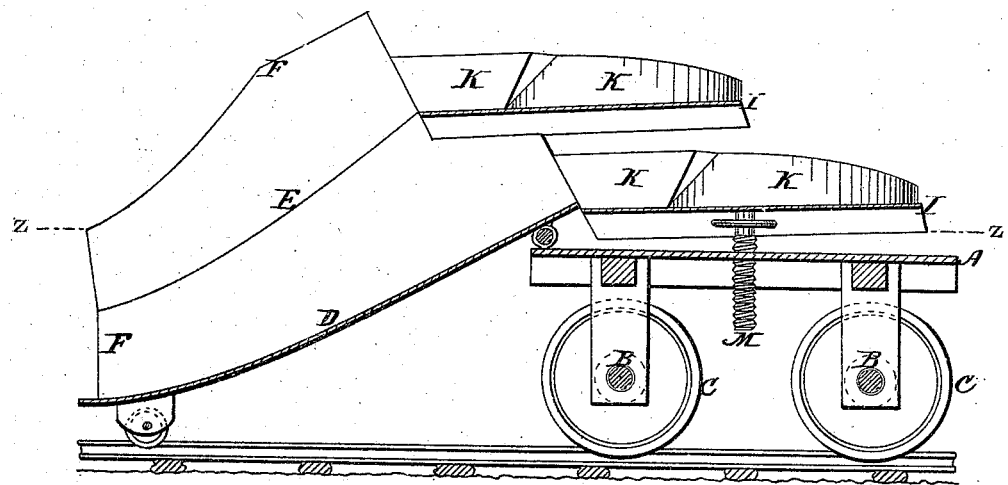

UNITED STATES PATENT OFFICE.

JOHN MILTON SMITH, OF BURDETT, NEW YORK.

IMPROVEMENT IN SNOW-PLOWS.

Specification forming part of Letters Patent No. 149,536, dated April 7, 1874; application filed March 10, 1874.

*To all whom it may concern:*

Be it known that I, JOHN M. SMITH, of Burdett, in the county of Schuyler and in the State of New York, have invented certain new and useful Improvements in Track-Cleaners; and do hereby declare that the following is a full, clear, and exact description thereof, reference being had to the accompanying drawings making a part of this specification, in which—

Figure 1:
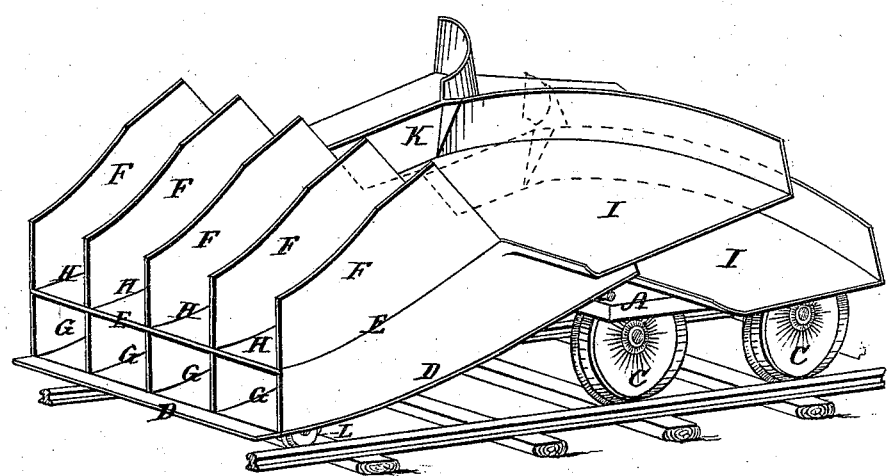
Figure 2:
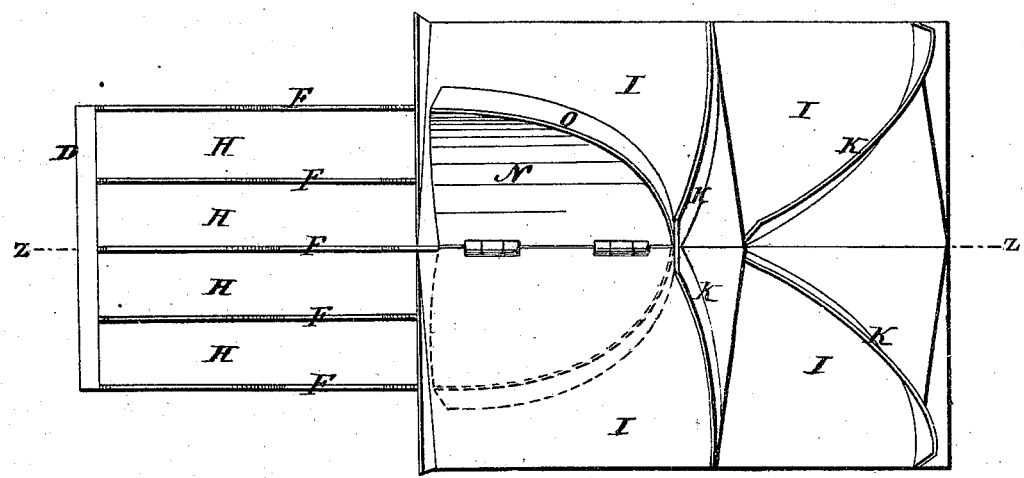

Figure 1 is a perspective view of my improved device in position upon a railroad-track. Fig. 2 is a plan view of the upper side of the same. Fig. 3 is an elevation of its rear side, and Fig. 4 is a vertical central section on line z z of Fig. 2.

Letters of like name and kind refer to like parts in each of the figures.

The design of my invention is to remove snow from a railroad-track by raising it above and throwing it upon the surface of the ground upon either side of the track; and it consists, principally, in the employment of two or more series of chutes, arranged in parallel lines, inclining upward and rearward, and communicating at their rear ends with rearward and outward curving tables, substantially as and for the purpose hereinafter specified.

In the annexed drawings, A represents the platform of an ordinary car-truck, which rests upon and is supported by means of two axles, B, upon the ends of which are affixed car-wheels C, all in the usual manner. Hinged to or upon one end of the platform A, and from thence extending forward and downward to or near the track, is a frame-work, consisting of a lower and an upper horizontal table, D and E, respectively, connected together by means of five vertical walls or partitions, F, which latter extend above said table E to a height equal to the distance between the same and said lower table, the arrangement of said parts being such as to form two series of chutes, G and H, the latter of which are uninclosed at their upper sides. Horizontally the chutes G and H are uniform in width along their entire length; but vertically they increase in size from their front toward their rear ends, until at the latter points said chutes have nearly twice the transverse area of their forward ends. Immediately in rear of each table D and E, and upon a line with its transverse center, is placed a table, I, which, transversely, is formed upon a double incline, as shown in Fig. 3, while from front to rear it is straight, and has a slight upward inclination. Said table extends laterally outward beyond the chutes and truck to any desired distance. From the rear end of the center partition F a division-plate, K, extends rearward for a short distance, and, dividing, extends from thence outward and rearward in a curve, and terminates at the outer rear corners of the table I. The front edge of said table is turned upward from its center outward in either direction, as seen in Fig. 1, so as to bring said edge even with the lower side of the outer chutes. The forward end of the chute-section is provided with suitable bearing-wheels L, which may be caused to run upon the upper or inner sides of the track, as is desired, while its rear end is adjusted to and sustained in position by means of a screw, M, that passes upward through a suitable nut placed within the platform A, and bears upon or against the lower side and center of the lower table.

The device is now complete, and operates as follows: Upon being pushed along the track, any snow resting thereon will be forced into the chutes G and H, and, through the same, upon the tables I, from whence said snow will be turned outward by the curved wing of the division-plate, and fall upon the ground entirely outside of the space required for the passage of cars.

By dividing the snow into several streams, and causing each to pass upward and rearward through a separate chute, much less resistance is offered to the passage of the device than would be true if said snow were in one mass, more especially in the event of any dampness of the same.

It is intended that the principal portion of the elevating apparatus shall be constructed of wood, with the exposed parts protected by metal plates; but, if deemed best, the whole machine can be made of metal plates, which, from the peculiar form of the parts and the strength afforded by their combination, could be of much less thickness than that commonly employed.

When it is desired to throw the snow entirely to one side of the track, a table, N, having the shape shown in Fig. 2, is hinged at one edge to or upon the transverse center of the tables, so as to be capable of turning in either direction. The rear end and outer side of said hinged table N are inclosed by means of a wing, O, which extends outward and forward in a curve, and, when in use, catches the rearward-flowing current of snow, and turns it over upon the opposite side of the main tables I, from whence said snow passes to the ground.

Having thus fully set forth the nature and merits of my invention, what I claim as new is—

1. The hinged table N, provided with the wing O, and combined with the tables I and chutes H, in the manner and for the purpose set forth.

2. The chute-section hinged to or upon the front end of the platform A, and adjusted vertically at its rear end by means of the screw M, operating in and through said platform, substantially as and for the purposes shown.

3. The track-cleaner in which the series of chutes G and H are constructed and combined with the tables I I substantially in the manner and for the purpose shown.

In testimony that I claim the foregoing I have hereunto set my hand and seal this 17th day of February, 1873.

JOHN MILTON SMITH. [L. S.]

Witnesses:
ARCHIBALD PATERSON,
GEORGE B. PATERSON.